United States Patent
Wagner

(10) Patent No.: US 12,491,303 B2
(45) Date of Patent: Dec. 9, 2025

(54) RESTLESS BUTTON ACCESS HEMORRHAGE/NEEDLE DISCONNECTION

(71) Applicant: B. Braun Avitum AG, Melsungen (DE)

(72) Inventor: André Wagner, Kassel (DE)

(73) Assignee: Braun Avitum AG, Melsungen (DE)

(*) Notice: Subject to any disclaimer, the term of this patent is extended or adjusted under 35 U.S.C. 154(b) by 408 days.

(21) Appl. No.: 18/103,564

(22) Filed: Jan. 31, 2023

(65) Prior Publication Data

US 2023/0241300 A1    Aug. 3, 2023

(30) Foreign Application Priority Data

Feb. 1, 2022 (DE) .................... 10 2022 102 274.9

(51) Int. Cl.
*A61M 1/36* (2006.01)

(52) U.S. Cl.
CPC ....... *A61M 1/3621* (2013.01); *A61M 2205/18* (2013.01); *A61M 2205/3331* (2013.01)

(58) Field of Classification Search
CPC .............. A61M 1/3621; A61M 1/3639; A61M 2205/3331; A61M 2205/15; A61M 2205/505; A61M 2205/18
See application file for complete search history.

(56) References Cited

U.S. PATENT DOCUMENTS

2006/0074369 A1    4/2006  Oishi et al.
2015/0306301 A1*  10/2015  Strohhoefer ........ A61M 1/3607
                                                          702/183
2016/0158433 A1    6/2016  Wiktor et al.
2018/0126062 A1    5/2018  Solem et al.
2019/0143025 A1    5/2019  Spickermann et al.
2019/0381233 A1   12/2019  Frinak et al.

FOREIGN PATENT DOCUMENTS

DE    102016005213 A1    11/2017
EP        3445419 A1     2/2019
EP        3019212 B1    12/2020
WO     2015003795 A1     1/2015
WO     2017186354 A1    11/2017

OTHER PUBLICATIONS

Search Report received in German Application No. 10 2022 102 274.9 dated Oct. 4, 2022, with translation, 12 pages.
Search Report received in European Application No. 23154169.9-1113 dated Jun. 15, 2023, with translation, 13 pages.

* cited by examiner

*Primary Examiner* — Susan S Su

(74) *Attorney, Agent, or Firm* — Christopher A. Rothe; CM Law

(57) ABSTRACT

A monitoring device of a dialysis machine and a method for detecting a venous needle disconnection via venous pressure monitoring based on a threshold value setting. The device includes a button, preferably arranged on a screen of the dialysis machine. The button is configured, upon actuation, to set a lower threshold value and an upper threshold value depending on an actual pressure and to detect an incremental decrease in the venous pressure.

12 Claims, 7 Drawing Sheets

RESTLESS BUTTON ACCESS HEMORRHAGE/NEEDLE DISCONNECTION

CROSS-REFERENCE TO RELATED APPLICATION(S)

This application claims priority under 35 U.S.C. § 119 to German Patent Application No. 10 2022 102 274.9, filed Feb. 1, 2022, the content of which is incorporated by reference herein in its entirety.

FIELD

The present disclosure relates to a monitoring device of a dialysis machine for detecting a venous needle disconnection via venous pressure monitoring based on a threshold value setting. The present disclosure further relates to a monitoring method for detecting a venous needle disconnection.

BACKGROUND

A venous needle disconnection, also called access hemorrhage, is estimated to occur at least once a year in every dialysis center worldwide. Such a needle disconnection is an interruption of an existing connection between a venous access and an infusion line. If left undetected, a venous needle disconnection can lead to the patient's death within a few minutes. The risk of dangerous disconnections is increased by a restless patient, unfamiliarity with pressure monitoring of a dialysis machine, and inadequate monitoring of the patient.

For monitoring the venous access, the pressure of the blood entering a catheter or a shunt can be used. Here, venous pressure is measured after the dialyzer and before a final clamp of the dialysis device. If the pressure rises or falls outside a threshold value range, the blood pump stops immediately and triggers a patient-safe condition.

In the systems known so far, a lower and an upper threshold value can only be set individually during treatment. Such an individual setting is only possible with increased effort, since these settings can often only be found in a deeper menu item with some machine knowledge, such as: Submenu Input/Limits/PV/Upper Δ or OV Lower Δ'.

For example, asymmetric pressure monitoring as a default setting can only be set by a technical service in the technical support and maintenance program (TSM).

Another disadvantage is that an incrementally decreasing venous pressure is often not recognized by the dialysis machine as a venous needle disconnection. In addition, a venous pressure alarm that may have been triggered can be resolved by a simple acknowledgement by the user, wherein the restart of the blood pump leads to an adjustment of the currently prevailing venous actual pressure.

In principle, the purpose of pressure monitoring is to detect as reliably as possible various complications that may occur during extracorporeal blood treatment. Possible complications include faulty vascular access due to the cannula slipping out or being sucked in, for example. A change in pressure also occurs when there is a change in the volume of blood delivered by a blood pump.

EP3445419 A1 relates to a blood treatment machine having a control, having a pump actuator for pumping blood through an extracorporeal blood circuit which comprises an arterial line (upstream of a dialyzer) and a venous line (downstream of a dialyzer), and having a pressure sensor for detecting the pressure in the venous line, wherein the control has a detection function for detecting a venous needle disconnect which compares a value determined on the basis of the pressure in the venous line with a limit value to recognize a venous needle disconnect, wherein the limit value with which the detection function compares the value determined on the basis of the pressure in the venous line can be set variably and/or is set variably by the control.

EP3019212 A1 relates to a method for monitoring an extracorporeal blood treatment device comprising an extracorporeal blood flow, in particular for monitoring a venous needle disconnection by pressure pulse measurement at the extracorporeal blood flow. EP3019212 A1 further relates to a device for carrying out a monitoring method and to a blood treatment device comprising a corresponding monitoring device.

In the above-mentioned known systems, it is provided that an alarm is triggered in case of failure to maintain certain, fixed threshold values, in order to be able to ensure patient safety continuously and completely. During dialysis treatment, however, dynamic adjustment of the threshold values is advantageous, since static threshold values have the disadvantage of triggering false alarms in certain situations, which may have a negative effect on dialysis treatment.

SUMMARY

It is the object of the present disclosure to eliminate or at least reduce the above-mentioned disadvantages of the prior art and preferably to enable improved handling of restless patients, further preferably to eliminate any existing lack of knowledge about the pressure monitoring of the dialysis machine and thus to improve the possibly insufficient monitoring of the patient, in order to avoid life-threatening venous needle disconnections as far as possible in this way and to improve the usability of the dialysis machine.

The aforementioned object is solved by the features of claim 1. Advantageous embodiments are the subject matter of the dependent claims.

Accordingly, the aforementioned object is solved by a monitoring device of an extracorporeal blood treatment machine, preferably a dialysis machine, for detecting a venous needle disconnection via venous pressure monitoring based on a threshold value setting. According to the disclosure, the monitoring device has a button (icon), hereinafter also referred to as 'restless button', which is provided and configured, upon an/its actuation, to cause the monitoring device to set or to be able to set a lower threshold value and an upper threshold value depending on a (measured) ACTUAL pressure and to detect an incremental decrease in the venous pressure. The term "incremental decrease", as used herein, means a drop in pressure from one relatively stable pressure range to a much lower relatively stable pressure range.

In other words, such a, preferably preconfigured, 'restless button' improves monitoring of the patient, in particular of the inserted access during dialysis treatment. Accordingly, pressing the button triggers a preconfigured venous alarm window and monitoring of an incrementally decreasing venous pressure. In incremental pressure monitoring, the dialysis system/monitoring device is intended to detect an incrementally decreasing venous pressure when the button is actuated. According to the known prior art, an incrementally decreasing venous pressure cannot be detected by current algorithms if the lower venous threshold value is adjusted to the current pressure course after triggering a venous pressure alarm or readjusting the blood flow.

The button is preferably a touch icon on a touch display, which can be operated by touching/pressing. In other words, the button is an operating element in a graphical user interface, alternatively designed as a pushbutton or key.

Furthermore, it is preferred that the button is located on a screen of the dialysis machine in order to improve the usability of the monitoring device. Preferably, this button remains visible and operable on the screen regardless of which submenu is (currently) displayed on the screen.

Preferably, the ACTUAL pressure is a floating average value in a range of preferably 48 mmHg to 69 mmHg. An evaluation of about 20,000 hemodialysis treatments shows an average upper venous pressure window of about 69 mmHg and a lower pressure window of about 48 mmHg. Both average pressure values are well above the pressure values of 40 mmHg and 25 mmHg proposed in a subsequent aspect, which results in an increase in the sensitivity of monitoring and is within the scope of the present disclosure.

It is advantageous if the lower threshold value and the upper threshold value are asymmetrical to the ACTUAL pressure. In other words, it is provided that the setting (automatically triggered/performed upon pressing the button) of a lower and an upper threshold value results in an asymmetric pressure window. That is, the lower and upper venous threshold values are (automatically) fixed to an asymmetric venous pressure monitoring when the button is pressed.

Advantageously, a difference between the upper threshold value and the ACTUAL pressure is greater than a difference between the lower threshold value and the ACTUAL pressure. Asymmetric pressure monitoring with a close approach of the lower limit leads to an improvement in sensitivity with respect to a venous needle disconnection.

It is preferred that the lower threshold value be set 25 mmHg below the ACTUAL pressure and the upper threshold value be set 40 mmHg above the ACTUAL pressure. In other words, the lower and upper venous threshold values are fixed at 25 mmHg below the ACTUAL pressure and 40 mmHg above the ACTUAL pressure when the button is actuated for asymmetric venous pressure monitoring. The evaluation of the above-mentioned approximately 20,000 hemodialysis treatments in Germany showed a proportion of 19.9% that fell below the lower pressure limit of 25 mmHg from the ACTUAL pressure. The upper pressure window of 40 mmHg prevents false alarms triggered by movements of the shunt arm, which impair the undisturbed dialysis process.

It is advantageous if the monitoring device is provided and configured to increase the lower threshold value LCL to a new threshold value Nlcl after a predetermined time, preferably 250s to 350s, more preferably 300 seconds, has elapsed, if the floating average value has increased by more than a predetermined amount, preferably more than 2.5 mmHg. Waiting for the predetermined time has the advantage of avoiding false alarms, as experience has shown that a patient is restless at the beginning of a treatment until the patient is in a comfortable position.

It is preferred if the monitoring device is provided and configured to decrease the lower threshold value LCL to a new threshold value Nlcl after a predetermined time, preferably 300 seconds, has elapsed if a distance between the new floating average value and the lower threshold value is less than a lower target threshold value.

Advantageously, the monitoring device is provided and configured to save the new lower threshold value Nlcl and to check whether an incremental decrease is present, wherein in case of an incremental decrease, the monitoring device is provided to output an alarm.

It is preferred if the monitoring device is provided and configured to check that the previously set lower threshold value LCL does not deviate by more than a predetermined percentage p % from the floating average value of the last predetermined time, preferably 300 seconds. Here, it is preferred if the percentage p % takes a value between 1% and 30%. In other words:

$$\text{Incremental\_ALM} = LCL < \text{Nlcl} \ast (1+p)$$

In other words, the newly set, venous lower threshold value Nlcl must not be lower than the calculated floating average value to the previously set, venous lower threshold value LCL, which is calculated as follows:

$$PV^{\Delta} = \left(\left(\sum_{T=1}^{300} PV\min_T + PV\min_t\right) \ast \frac{1}{T+t}\right) \ast p\%$$

This monitoring is intended to protect the patient from, for example, undetected bleeding into the tissue by detecting a decreasing pressure. Furthermore, the alarm is handled as follows: the button, i.e., the automatic setting of an asymmetric pressure window and the algorithm for monitoring an incrementally decreasing venous pressure does not replace the implemented algorithm for monitoring the venous shunt pressure until the button has been actuated by a user.

It is advantageous if the monitoring device is provided and configured to issue an alarm when a lower threshold value is undershot and when an upper threshold value is exceeded, wherein at least the alarm when the lower threshold value is undershot is to be acknowledged via a PIN input.

Preferably, the monitoring device is provided and configured such that after a predetermined number of alarms to be acknowledged with a PIN input, preferably two alarms, further preferably three alarms, an alarm different from the previous alarm is issued. In other words, when the button is pressed, an incrementally decreasing venous pressure is to be detected in such a way that after a venous pressure alarm has been acknowledged twice, alternatively three times, a 'red alarm' is triggered, and the blood pump remains stopped. This 'red alarm' describes in detail on a screen of the dialysis machine how the venous access is to be checked and can only be activated via a PIN code. It is preferable if the PIN code is exclusively in the possession of the head nurse.

In other words, according to one example, when a first alarm occurs, the blood pump is stopped. As soon as this first alarm is acknowledged without PIN input, the blood pump starts again. As soon as a second, preferably third alarm occurs, the blood pump stops again and the alarm can only be acknowledged via PIN input. If the second or respectively third acknowledgement results in a 'red alarm', the blood pump remains stopped.

It is preferred that when the venous (shunt) pressure decreases below the lower threshold value, the user receives an instruction to check the shunt arm and the triggered alarm can only be acknowledged by inputting a PIN code. In other words, in order to clarify the criticality of the venous pressure alarm and to recommend an instruction to the user to check the shunt arm, the alarm can be acknowledged exclusively with a PIN code. Triggering the alarm will cause the blood side to shut down, resulting in a stop of the blood pump and preventing leakage of the patient's blood into the environment or tissue.

It is preferred that the alarm is acknowledgeable/has to be acknowledged without a PIN input when the upper threshold value is exceeded and that the alarm is acknowledgeable/has to be acknowledged with a PIN input when the value falls below the lower threshold value.

Alternatively, it is preferred that the alarm is acknowledgeable/has to be acknowledged with a PIN input both when the upper threshold value is exceeded and when the lower threshold value is undershot.

It is advantageous if an alarm is triggered when the upper venous threshold value is exceeded, which stops the blood pump. For this alarm, no PIN input is required for acknowledgement. Exceeding the upper venous pressure is caused by a movement of the patient, in particular kinking of the venous blood tube. The alarm should nevertheless describe in detail how to check the venous blood tube line and the venous vessel access.

Furthermore, the present disclosure relates to an extracorporeal blood treatment machine, preferably a dialysis machine, which is characterized by a monitoring device according to one of the preceding aspects.

Furthermore, the present disclosure relates to a monitoring method for detecting a venous needle disconnection with venous pressure monitoring based on a threshold value setting, comprising the following steps:
  actuating the button to set a lower venous threshold value (LCL) and an upper venous threshold value based on an ACTUAL pressure,
  detecting a drop below the lower venous threshold value (LCL),
  decreasing or increasing the lower threshold value (LCL) to a new lower threshold value (Nlcl),
  saving the new lower threshold value (Nlcl), and
  checking if an incremental decrease is present.

Optionally, an alarm may be triggered if an incremental decrease is present.

It is preferred, when an incremental decrease is present, that the new lower threshold value falls below the previous floating average value by more than a predetermined percentage p %, such that the lower threshold value is smaller than the addition of the new lower threshold value and the predetermined percentage p %.

In summary, the present disclosure has the advantage that sensitivity to venous needle disconnection is improved as well as that detection of incrementally decreasing venous pressure is enabled. Furthermore, the present disclosure enables an improvement in the management of restless patients, for example, for reasons of dementia, blindness, unconsciousness, etc. Another advantage is the now uncomplicated operation/adjustment of optimal shunt monitoring. This leads to increased safety for night and home dialysis patients and the number of life-threatening venous needle disconnections could be reduced.

DETAILED DESCRIPTION

The following describes configuration examples of the present disclosure based on the accompanying figures.

Figure 1:
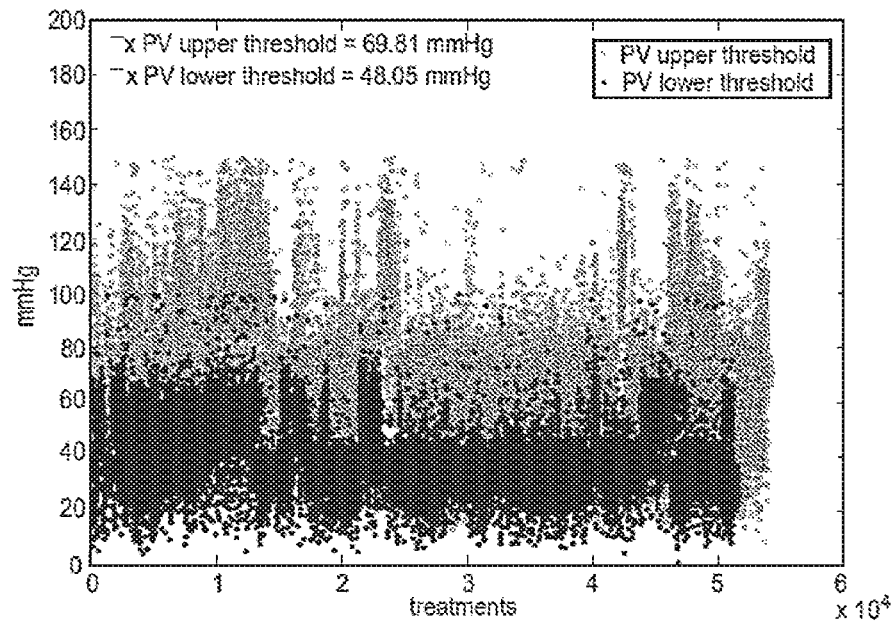
FIG. 1 is a representation illustrating an evaluation to determine a floating average value of venous pressure.

FIG. 1 is a representation illustrating an evaluation to determine a floating average value of the venous pressure. FIG. 1 is a diagram showing the number of treatments with a factor of $10^4$ on the x-axis and the venous pressure in mmHg on the y-axis. In the diagram, empty points are drawn for the venous pressure of the upper threshold value and full points for the venous pressure (hereinafter also referred to as PV) of the lower threshold value. Via these points, it is possible to determine a floating average value x for the upper threshold value and a floating average value x for the lower threshold value.

Based on the diagram, an evaluation of about 20,000 hemodialysis treatments was conducted and the starting values of about 69 mmHg were determined as floating average value x for the upper threshold value and about 48 mmHg as floating average value x for the lower threshold value. These average pressure values are significantly higher than the pressure values used in the present disclosure for setting the asymmetric venous pressure window of 40 mmHg and 25 mmHg. This leads to an increase in the sensitivity of the monitoring.

Figure 2:
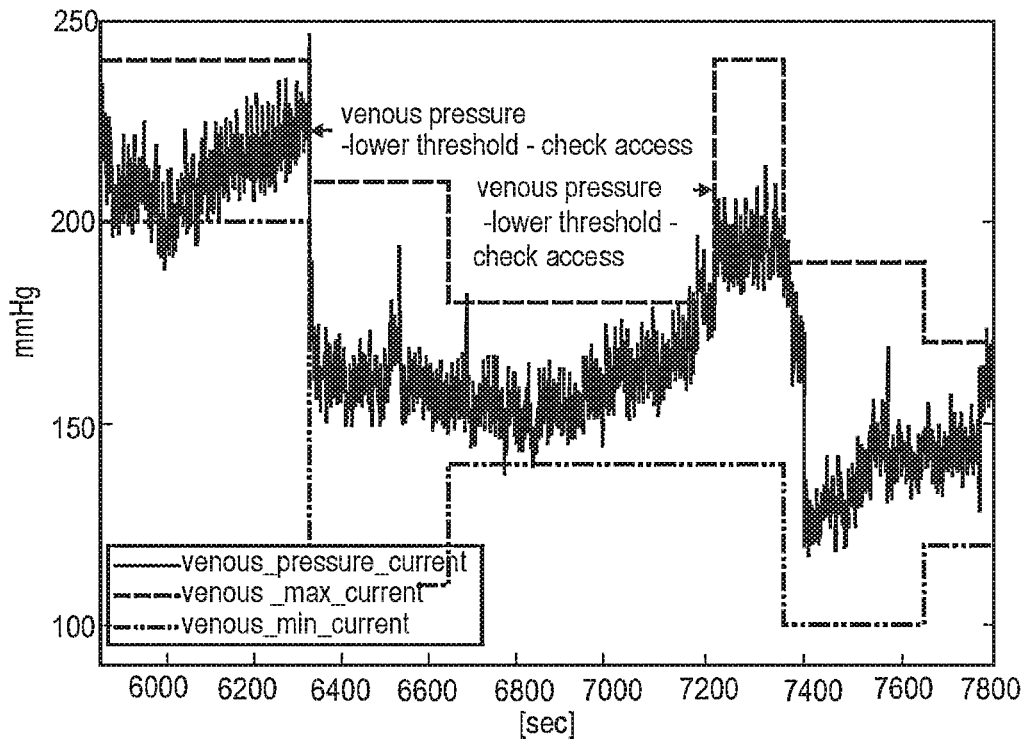
FIG. 2 is a representation illustrating an incremental decrease according to the prior art.

FIG. 2 is a representation illustrating an incremental decrease according to the prior art. The graph of FIG. 2 as well as the graph of FIG. 3 has the time in seconds in a time range from 6000 seconds to 7800 seconds on the x-axis and the venous pressure in mmHg on the y-axis.

In the graph of FIG. 2, a venous pressure course according to the prior art is shown, which is represented with a continuous line under the designation 'venous pressure_current'. A first upper threshold value (hereinafter also referred to as 'venous_max_current') is drawn at 250 mmHg and a first lower threshold value (hereinafter also referred to as 'venous_min_current') is drawn at 200 mmHg. After about 300 seconds, an alarm is triggered due to the dropped current venous pressure, which causes the access to be checked and the threshold values to be set to the current new pressure value. After another 300 seconds, the lower threshold value is corrected again, in this case increased and the upper threshold value is decreased. At second 7200, the pressure values exceed the upper threshold value, resulting in only the upper threshold value being adjusted. After the pressure course triggers another alarm in the further course of time due to a drop in pressure, the threshold values are corrected downwards according to the current pressure.

An incremental, hidden decrease in pressure can be detected in the pressure course. This venous incremental decrease in pressure cannot be detected by previous algorithms because a lower threshold value is adjusted to the current pressure course after triggering a venous pressure alarm or readjusting the blood flow. This does not take into account the type of previous alarm or alarms.

Figure 3:
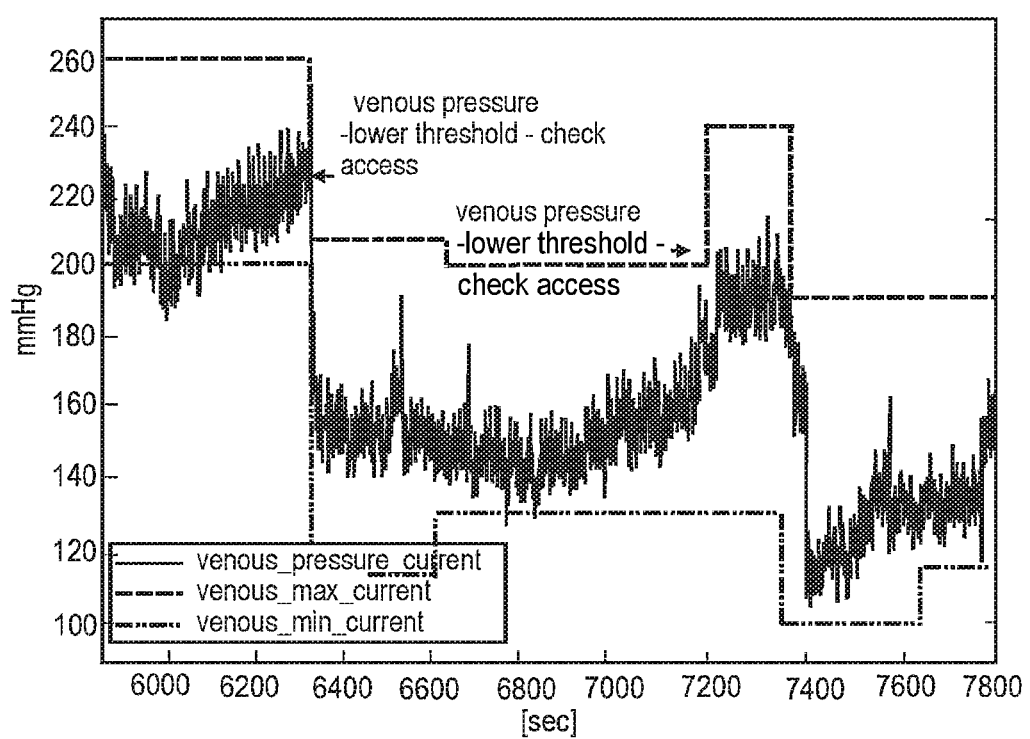
FIG. 3 is a representation illustrating an incremental decrease according to the present disclosure.

In the graph of FIG. 3, which is very similar to the graph in FIG. 2, a venous pressure course (according to FIG. 2) is shown, which is represented with a continuous line under the designation 'venous_pressure_current'. A first upper threshold value (hereinafter also referred to as 'venous_max_current') is drawn at 260 mmHg and a first lower threshold value (hereinafter also referred to as 'venous_min_current') is drawn at 200 mmHg. After approximately 300 seconds, an alarm is triggered due to the decreased current venous pressure, which causes the access to be checked and the threshold values to be set to the current new pressure value. After another 300 seconds, the lower threshold value is corrected again, in this case increased and the upper threshold value is decreased. At second 7200, the pressure values exceed the upper threshold value, whereby only the upper threshold value is adjusted. After the pressure course triggers another alarm in the further course of time shortly before second 7400 due to a drop in pressure, the threshold values are corrected downwards according to the current pressure. Between second 7600 and second 7700, the lower threshold value was adjusted again.

FIG. 3 therefore shows the upper and lower threshold values according to the pressure window as the starting value. Furthermore, FIG. 3 shows the threshold value adjustments provided according to the invention, wherein the procedure is described in more detail later for FIG. 4.

Figure 4:
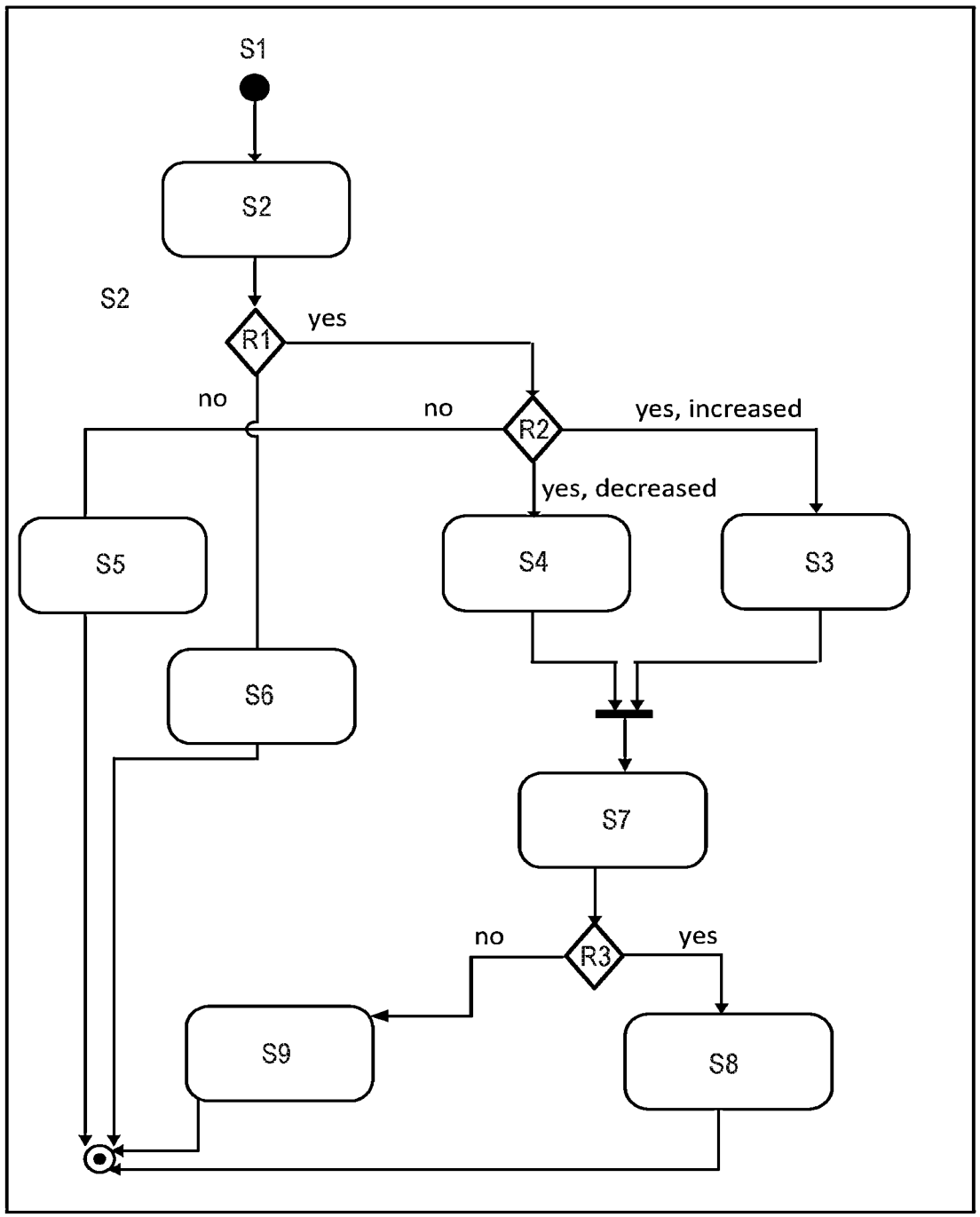
FIG. 4 is a flowchart illustrating the method steps according to the monitoring method according to the present disclosure.

FIG. 4 is a flow chart for the representation of the method steps according to the monitoring method according to the present disclosure. In FIG. 4, in a first step S1, the restless button is pressed and based on a current venous pressure, according to step S2, a floating average value x is determined. After pressing the button according to S1, based on the floating average value x, an asymmetric venous pressure window with an upper and a lower threshold value LCL is automatically set.

In the OR logic R1, when an alarm is triggered, it is determined/checked whether a predetermined time of preferably 300 seconds has elapsed since the last setting of the asymmetric pressure window.

In the case where a predetermined time has elapsed since the last setting of the upper and lower threshold value LCL according to R1, i.e. the predetermined time Δt>300 seconds (R1: yes), the current venous pressure (ACTUAL pressure) is detected in the OR logic R2 and it is checked whether the floating average value x has increased by more than 2.5 mmHg. If the floating average value has increased by more than 2.5 mmHg (R1: yes, increased), the previous lower threshold value LCL is increased correspondingly according to step S3 and a new lower threshold value nLCL is provided as a target threshold value.

In the case where it is determined in R2 that a distance between the current averaged ACTUAL value and the previous lower threshold value is smaller than a target threshold value, the lower threshold value is reduced correspondingly according to step S4 and a new lower threshold value nLCL is provided as a target threshold value.

In the case where neither step S3 nor step S4 is fulfilled in R2, the blood pump is reset according to step S5 (R2: no) in accordance with the current ACTUAL pressure.

In the case where a predetermined time has not elapsed since the last setting of the upper and lower threshold value LCL according to R1, the lower and upper threshold value LCL according to step S6 (R1: no) are kept unchanged.

If a change of the lower threshold value is necessary following step S3 or step S4, the new lower threshold value nLCL is saved in step S7. In a subsequent OR logic R3, it has to be checked whether the most recently set lower threshold value LCL does not deviate by more than a predetermined percentage p % from the floating average value x of the last predetermined time, preferably the last 300 seconds. In the case where the previous lower threshold value LCL is less than the sum of the new lower threshold value nLCL and the predetermined percentage p % of the floating average value x (R3: yes), there is an incremental decrease in venous pressure according to step S8 and the device displays a venous needle disconnection alarm and the blood pump stops. The device restarts the monitoring method. In the case where R3 does not apply, the monitoring method follows step S9 (R3: no) and the new venous lower threshold value nLCL is set.

Figure 5:
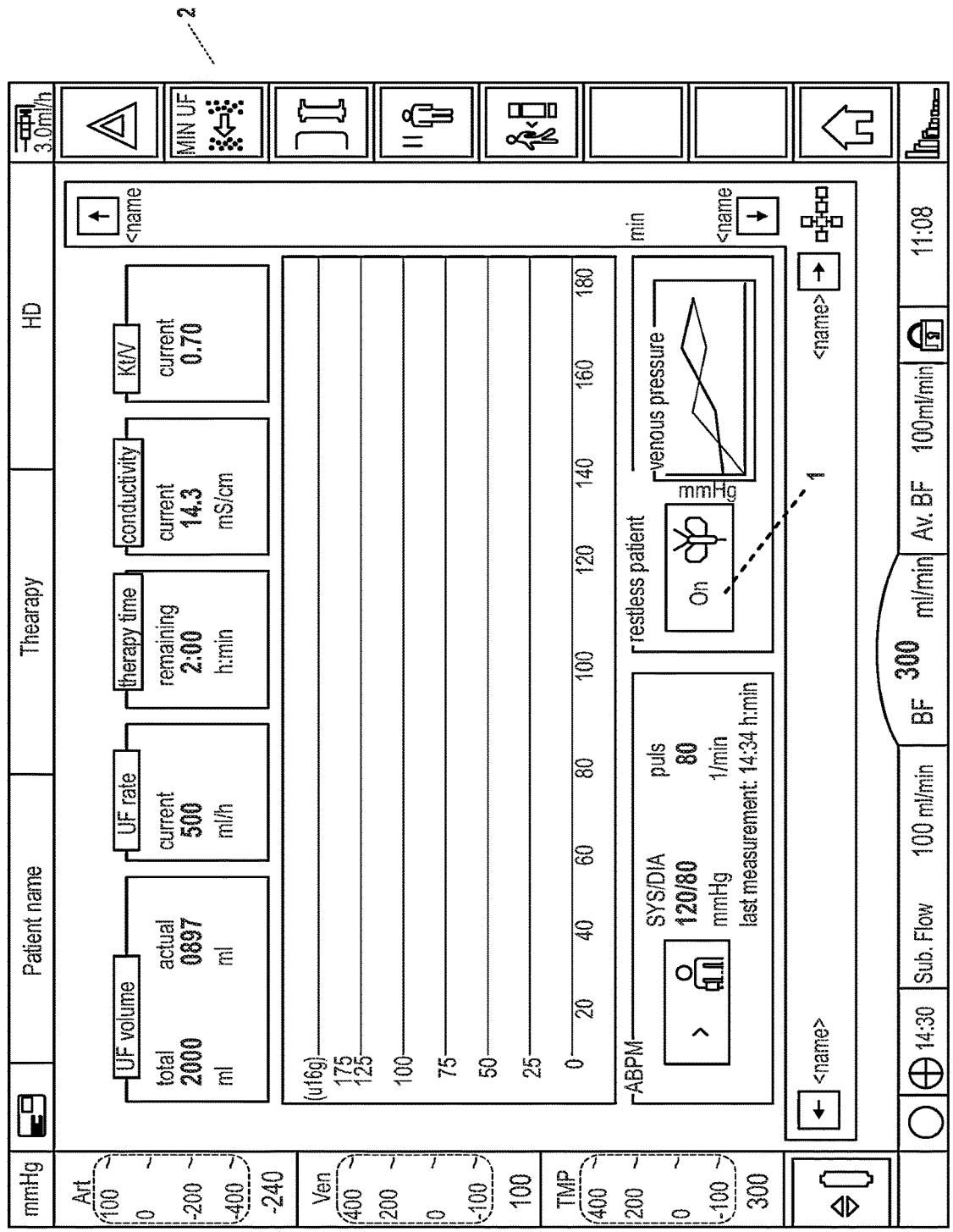
FIGS. 5 to 7 are each a representation illustrating a display of a dialysis machine.
Figure 6:
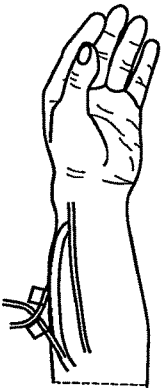
Figure 7:
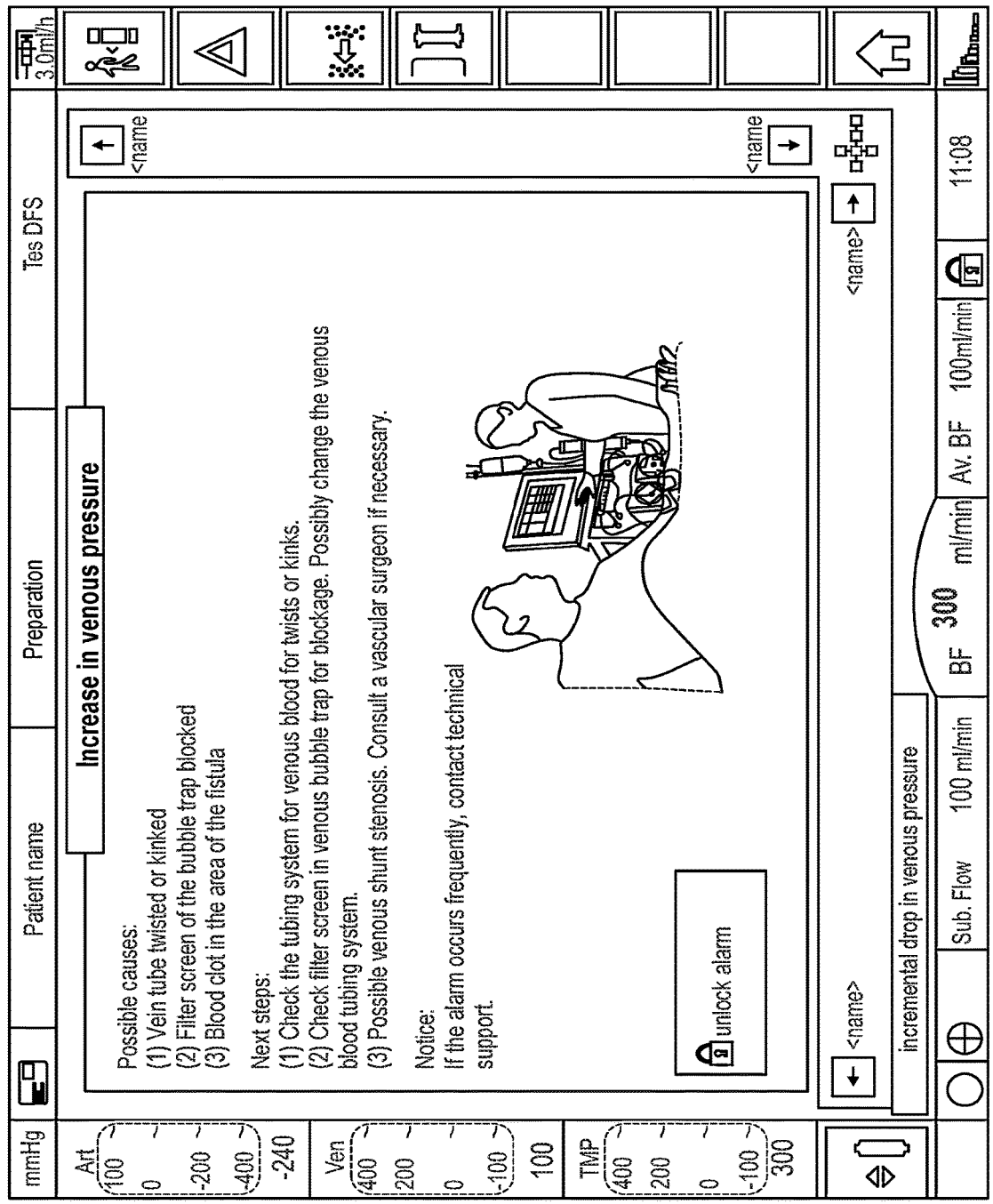

FIGS. 5 to 7 are each a representation illustrating a display 2 of a dialysis machine.

Here, FIG. 5 shows the start display on the display 2 with a button 1 (also called 'restless button'). Button 1 is located in a field with the heading 'restless patient'. This field also shows the pressure course of the venous pressure. In addition, all of the patient's vital signs are shown on display 2 with the start display.

FIG. 6 shows, after an alarm has been triggered due to a venous needle disconnection, a detailed description of how to resolve the alarm including the possible causes for the alarm that occurred. The following points are exemplary causes for an alarm due to falling below a lower threshold value:

(1) Decannulation of the venipuncture cannula
(2) Bleeding in the tissue
(3) Tube rupture in venous tubing system
(4) Loosening of tubing connections
(5) Blood clot formation in the dialyzer Solutions suggested for this are shown as examples on the display as follows:

(1) Decannulation of the venipuncture cannula: check the venous puncture site, whether the needle is still in the shunt and whether blood is present outside the blood circuit.

(2) Bleeding in the tissue: check for penetration into the tissue around the puncture site (look for bruising).

(3) Tube rupture in the venous tubing system: check the entire venous blood tubing system from the venous bubble trap to the puncture site for ruptures.

(4) Detaching tubing connections: check the tubing connection from the tubing system to the cannula and also the venous pressure transducer.

(5) Blood clot formation in the dialyzer: check the dialyzer for blood clots and flush it with saline solution if necessary.

In addition, a button for unlocking the alarm is located below the detailed description.

FIG. 7 shows, after an alarm has been triggered due to a venous pressure increase, a detailed description of how to resolve the alarm including the possible causes for the alarm that occurred. The following items are examples of causes for an alarm due to an upper threshold value being exceeded:

(1) Vein tube twisted or kinked
(2) Filter screen of the bubble trap blocked
(3) Blood clot in the area of the fistula Proposed solutions for this are shown on the display as examples as follows:

(1) Check the tubing system for venous blood for twists or kinks.

(2) Check filter screen in venous bubble trap for blockage. Possibly change the venous blood tubing system.

(3) Possible venous shunt stenosis. Consult a vascular surgeon if necessary.

In addition, a button for unlocking the alarm is located below the detailed description.

Figure 8:
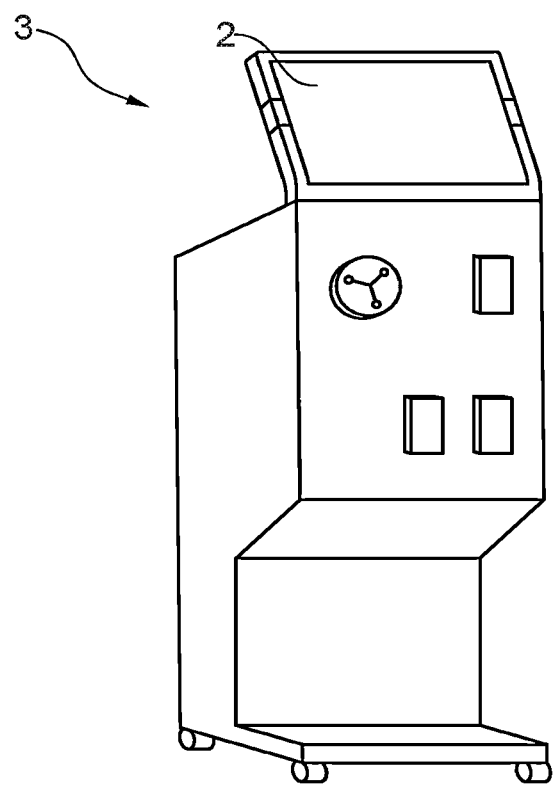
FIG. 8 shows an exemplary dialysis machine with a display integrated therein according to FIGS. 5 to 7.

FIG. 8 shows an exemplary dialysis machine 3 with an integrated display 2 according to FIGS. 5 to 7.

The invention claimed is:

1. A monitoring device of an extracorporeal blood treatment machine for detecting a venous needle disconnection via venous pressure monitoring based on a threshold value setting, the monitoring device comprising a button that is configured, upon actuation, to cause the monitoring device to:

set an original lower threshold value and an original upper threshold value based on an original measured floating average venous pressure value;

measure a new venous pressure value; and set a new lower threshold value based on the new venous pressure value;

wherein, upon the new venous pressure value being less than the original lower threshold value, the monitoring device is further configured to:

set the new lower threshold value to be less than the original lower threshold value; and identify that an incremental decrease in venous pressure is present upon determining that the new lower threshold value falls by more than a predetermined percentage from the original measured floating average venous pressure value.

2. The monitoring device according to claim 1, wherein the original measured floating average venous pressure value is a floating average value in a range of 48 mmHg to 69 mmHg.

3. The monitoring device according to claim 2, wherein the original lower threshold value and the original upper threshold value are asymmetrical to the original measured floating average venous pressure value and/or a difference between the original upper threshold value and the actual original measured floating average venous pressure value is greater than a difference between the original lower threshold value and the original measured floating average venous pressure value.

4. The monitoring device according to claim 2, wherein the new venous pressure value is a new measured floating average venous pressure value, and upon determining that the new measured floating average venous pressure value has increased above the original measured floating average venous pressure value by more than a predetermined value, the monitoring device is provided and configured to:

set the new lower threshold value to be greater than the original lower threshold value after a predetermined amount of time has elapsed.

5. The monitoring device according to claim 4, wherein the monitoring device is provided and configured to output an incremental decrease alarm upon identifying that the incremental decrease in venous pressure is present.

6. The monitoring device according to claim 5, wherein the monitoring device is provided and configured to require the incremental decrease alarm to be acknowledged via a PIN entry.

7. The monitoring device according to claim 6, wherein the monitoring device is provided and configured to issue a different incremental decrease alarm upon determining that a predetermined number of incremental decrease alarms have been output and acknowledged with respective PIN entries.

8. The monitoring device according to claim 7, wherein the monitoring device is provided and configured to output a pressure increase alarm upon setting the new lower threshold value to be greater than the original lower threshold value.

9. The monitoring device according to claim 1, wherein the original lower threshold value is settable 25 mmHg below the original measured floating average venous pressure value and the original upper threshold value is settable 40 mmHg above the original measured floating average venous pressure value.

10. The monitoring device according to claim 1, wherein the new venous pressure value is a new measured floating average venous pressure value.

11. An extracorporeal blood treatment machine, which is characterized by a monitoring device according to claim 1.

12. A monitoring method for detecting a venous needle disconnection with venous pressure monitoring based on a threshold value setting, comprising:

actuating a button to set an original lower threshold value and an original upper threshold value based on an original measured floating average venous pressure value, detecting a new venous pressure value, setting a new lower threshold value to be less than the original lower threshold value upon the new venous pressure value being less than the original lower threshold value, saving the new lower threshold value, and identifying that an incremental decrease in venous pressure is present upon determining that the new lower threshold value falls by more than a predetermined percentage from the original measured floating average venous pressure value.

* * * * *